April 4, 1961

R. W. AGNELLO ET AL 2,978,120

STORING AND DISTRIBUTING CONVEYORS

Filed July 24, 1957

INVENTORS
Richard W. Agnello
Michael Dabich
BY
Gerald J. Baldwin
Attorney

April 4, 1961 R. W. AGNELLO ET AL 2,978,120
STORING AND DISTRIBUTING CONVEYORS
Filed July 24, 1957 2 Sheets-Sheet 2

INVENTORS
Richard W. Agnello
Michael Dabich
BY

United States Patent Office 2,978,120
Patented Apr. 4, 1961

2,978,120
STORING AND DISTRIBUTING CONVEYORS

Richard W. Agnello, Detroit, and Michael Dabich, St. Clair Shores, Mich., assignors to F. Jos. Lamb Company, Detroit, Mich., a corporation of Michigan Filed July 24, 1957, Ser. No. 673,869

4 Claims. (Cl. 214—16)

This invention relates to improvements in storing and distributing conveyors. It is an object of the invention to provide a storing and distributing conveyor including a plurality of runways vertically spaced one above the other and connected at their adjacent extremities by curved diverters; to provide an endless chain which travels continuously along the runways and through the diverters; and to provide push rollers extending from the chain by which workpieces are adapted to be advanced around an entire circuit defined by the runways and diverters.

Other objects of the invention are to provide such a conveyor wherein the chain passes around sprockets mounted coaxially with the diverters, and the push rollers extend laterally from the chain so that workpieces are adapted to be advanced by them in one direction along one runway and in the opposite direction along another. Moreover the arrangement is such that workpieces are adapted to travel continuously around a complete circuit between the same pairs of push rollers.

A further object of the invention is to provide such a conveyor wherein each runway is upwardly inclined in the direction of movement of the push rollers therealong, so that the workpieces tend to remain in contact with the rollers.

Another object of the invention is to provide such a conveyor including means for delivering a workpiece thereonto between each adjacent pair of push rollers; and means for halting such delivery in each instance where a workpiece is already being recirculated between an adjacent pair of push rollers.

Yet another object of the invention is to provide such a conveyor including means for discharging workpieces therefrom through an opening in the runway; means for closing the opening; and means for preventing the closing of the opening at such time that an approaching workpiece might be trapped partly therein by the closing thereof whereby passage of following workpieces past the opening might be prevented.

Having thus briefly stated some of the objects and advantages of the invention I will now describe the invention in detail with the aid of the accompanying drawings, in which.

Figure 1:
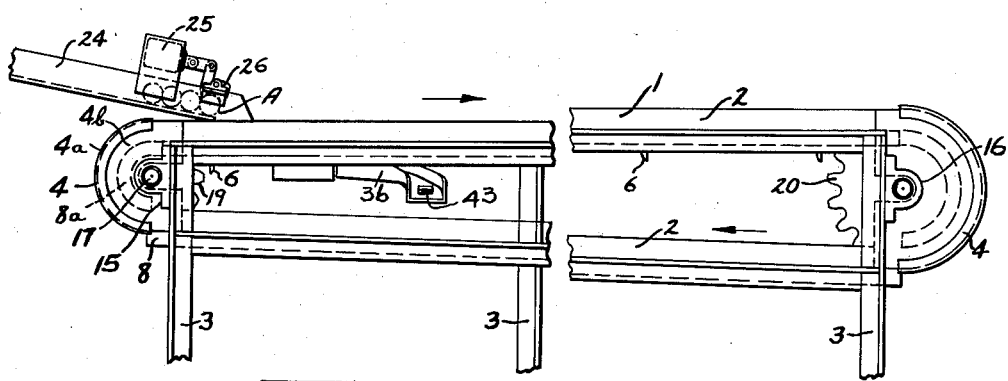
Figure 1 is a side elevation of the invention.
Figure 2:
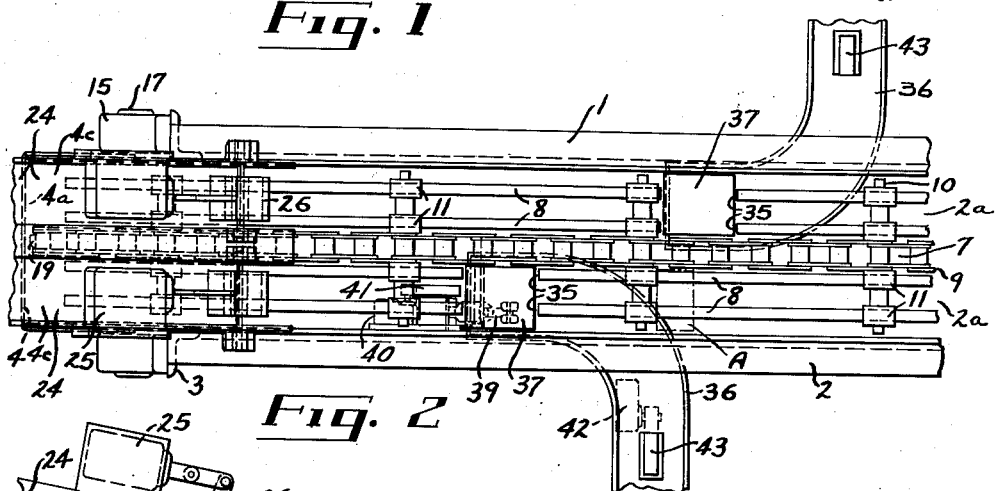
Figure 2 is a plan view of a portion thereof on a larger scale.
Figure 3:
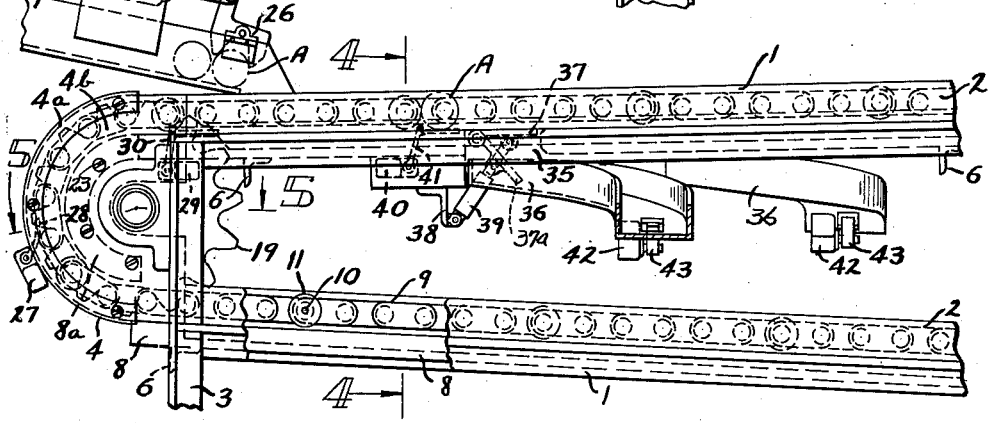
Figure 3 is a side view of Figure 2.
Figure 4:
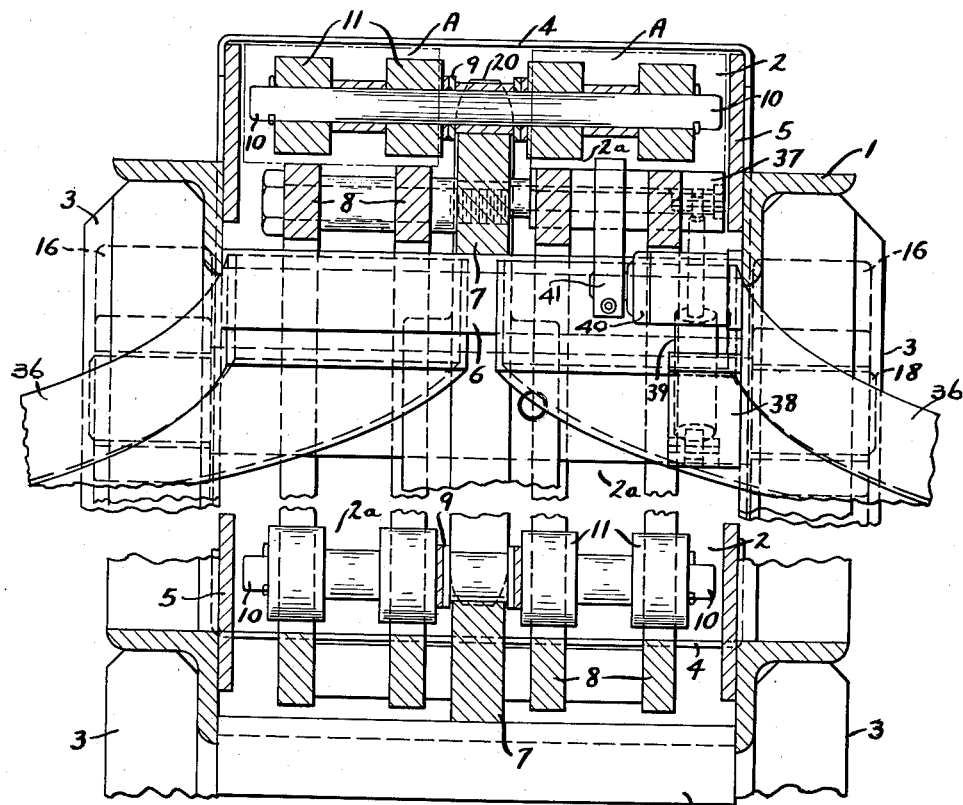
Figure 5:
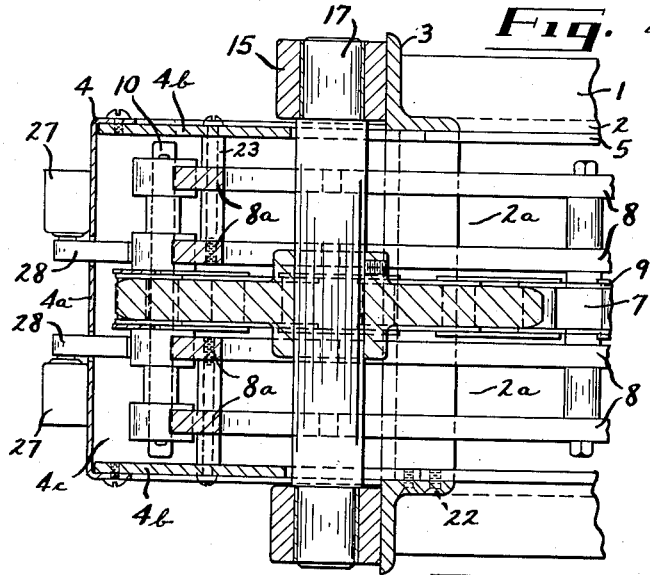

Figures 4 and 5 are enlarged sections on the lines 4—4 and 5—5, respectively, of Figure 3.

Figure 6:
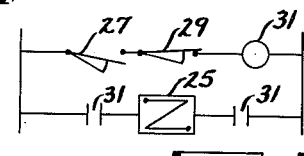
Figure 7:
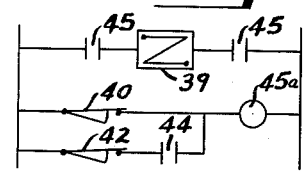

Figures 6 and 7 are electrical diagrams.

Referring to the drawings, 1 designates a conveyor having vertically spaced upper and lower runways 2 arranged one above the other and supported throughout their length by uprights 3. A substantially semi-circular diverter 4 connects each extremity of one runway with the adjacent extremity of the other, thereby providing an endless path along which workpieces A are adapted to travel. It will be noted that the runways 2 are slightly upwardly inclined in the direction in which the workpieces are intended to travel. Extending throughout the length of the runways and forming the outer sides thereof are longitudinal retaining plates 5 suitably secured to the uprights 3, and secured to and extending transversely between the latter and beneath each opposed pair of plates 5 are spaced bars 6. Supported on the bars centrally of their width and extending throughout the length of the runways are tracks 7. Spaced from one another and from the tracks on each side of the latter and parallel therewith are a plurality of rails 8 the upper faces of which are below the tops of the tracks. The upper and lower tracks each support a portion of an endless pin chain 9 for movement therealong. Projecting laterally at uniformly spaced intervals from the chain are pins 10, and, since in the present instance a double pin chain is shown, the pins project from both sides thereof. Mounted on each pin 10 on each side of the chain 9 are a plurality of suitably spaced push rollers 11 the diameter of which is such that they travel just above and clear of the rails 8 along which workpieces A are pushed by them. As the push rollers in this case project from both sides of the chain parallel lanes 2a are formed in each runway 2 which is thus divided centrally and longitudinally by the track 7 therein. Thus along each lane workpieces are adapted to be advanced by the rollers 11 extending from one side of the chain so that the capacity of the conveyor is doubled.

Mounted in the present instance on the uprights 3 at opposite extremities of the conveyor are transversely opposed pairs of bearings 15 and 16 to support shafts 17 and 18, respectively, one of which latter is driven in any preferred manner—not shown. It will also be noted that each shaft 17 and 18 is coaxial with one of the diverters 4. Mounted on the shafts 17 and 18 for rotation therewith are sprockets 19 and 20, respectively, around both of which the chain 9 travels. The sprockets 19 and 20 are of such proportionate diameters and their shafts are relatively so positioned that the chain travels at a slight upward inclination and parallel with the runways 2. Thus workpieces being advanced along the latter tend to remain against the rollers.

The diverters 4 have closed end walls 4a and parallel sides 4b which are secured as by screws 22 to the end uprights 3. Supported as by screws 23 extending inwardly through opposite sides of the diverters and coaxial therewith are substantially semi-circular rails 8a. The upper extremities of the rails 8a are in alignment with and form continuations of the upper rails 8, and their lower extremities terminate above the adjacent ends of the lower rails 8 so that workpieces entering either diverter travel between the outer faces of the rail 8a and the adjacent inner face of the end wall 4a of the diverter. Thus workpieces are retained between the same adjacent pair of push rollers 11 during their upward or downward travel from one runway to the other. Again during that time workpieces are also retained by the chain 9 between one side of the latter and the adjacent side 8b of the diverter so that a continuation 4c of each lane 2a is formed through each diverter.

Spaced above the lower end of the upper runway 2 are the discharge ends of two feed conveyors 24, preferably consisting of gravity chutes, each to discharge workpieces onto one of the lanes 2a. Extending over and supported by each feed conveyor 24 is a solenoid 25 and a pivotally mounted escapement arm 26 connected thereto. Each arm 26 is adapted to be moved by the solenoid connected thereto either to permit a workpiece to drop from the feed conveyor on which it is arranged onto the lane 2a beneath, or to prevent the discharge of a workpiece from the said feed conveyor.

Mounted on the end wall 4a of the diverter adjacent the feed conveyors are limit switches 27 each opposite one of the continuations 4c. Extending from each switch 27 is an arm 28 which is adapted to be actuated by a push roller 11 travelling up one of the continuations 4a or by a workpiece being advanced therethrough. Each arm 28 is so shaped that when moved by a passing workpiece to close its switch 27 the arm is retained in that position by the push roller immediately behind that workpiece until after the roller has also passed. Thus each switch, which is connected to the solenoid 25 above it, is closed at such intervals that a workpiece is normally dropped onto each lane 2a between each adjacent pair of push rollers travelling therealong. Means are also provided for preventing actuation of a solenoid 25 if a workpiece is being advanced from around the diverter between the two adjacent rollers between which another workpiece would otherwise be dropped from the feed conveyor above. In the present instance this is accomplished by providing another switch 29 on each side of the runway 2. Each switch 29 has an actuating arm 30 which projects forwardly along one of the lanes 2a so that during passage of a workpiece past it the arm is moved to open the switch 29 and break a circuit which includes the solenoid 25 above it. These two circuits for controlling the discharge of workpieces from the feed conveyors 24 are identical and are diagrammatically shown in Figure 6. Each circuit includes a switch 27 which is normally open, a switch 29 which is normally closed, a circuit relay 31, and a solenoid 25 having a spring return.

Each pair of rails 8 in at least one runway 2 has at least one longitudinal gap therein to form an opening 35 through which workpieces are adapted to drop from the lane 2a along which they were travelling onto one extremity of a delivery conveyor 36, ususually consisting of a gravity chute down which they travel and at the opposite end of which they may accumulate. Accumulation of workpieces in the gravity chutes may result from the machines being fed by the chutes temporarily not requiring workpieces as fast as they are dropping down the chutes. Accumulation may also arise as shown in U.S. Patent No. 2,833,393. The means causing the accumulation forms no part of the present invention; accumulation being part of the result of the application to which the invention is put. Each opening 35 is adapted to be closed by a gate 37 which is transversely hinged to the underside of the runway. Projecting downwardly from the underside of the latter adjacent each opening 35 is a support 38 to which one extremity of a solenoid 39 of the type having a spring return is pivoted, and the outer extremity of the solenoid plunger is pivotally secured to the underside of the adjacent gate 37, so that when the solenoid is energized the gate is opened, as indicated at 37a, and workpieces drop into the delivery conveyor 36 beneath. When the gate 37 is closed its upper face is in alignment with the upper faces of the rails 8 between which it extends so that workpieces may travel freely thereover. Mounted on the underside of the runway 2 adjacent each opening 35 is a switch 40 which is normally closed, and extending therefrom along the lane 2a in which the opening occurs is an actuating arm 41.

Provided also on each delivery conveyor 36 is a delayed action switch 42 which is normally closed and has an actuating arm 43 which extends upwardly through the conveyor base. This arm is adapted to be depressed to open the switch when a workpiece rests an appreciable time interval thereon; however due to the delayed action feature of the switch the latter is not opened by a workpiece travelling thereover. Each switch 42 is located a predetermined distance from the discharge end of the delivery conveyor 36 so that it is opened when a desired number of pieces have accumulated thereon.

To control the opening and closing of each gate 37 a circuit as shown in Figure 7 is employed. The circuit includes the switches 40 and 42 both of which are normally closed so that the gate 37 is open and workpieces drop freely through the opening 35 onto the conveyor 36. At first when the switch 42 is opened current continues to flow through magnetic contacts 45 in a relay 45a and retains the solenoid energized. However then when a workpiece approaching the opening 35 contacts the arm 41 and actuates the switch 40 the relay contacts 44 of relay 45a are opened and the solenoid 39 is de-energized whereupon its spring return closes the gate 37. The purpose of this arrangement is to prevent the closing of a gate 37 as a workpiece is dropping through an opening 35; for, should that occur, the workpiece would be liable to be trapped by the gate and passage of following workpieces would be interfered with.

From the foregoing it will be clearly seen that provision has been made for storing a number of workpieces by recirculating them until they are required in one of the delivery conveyors 36; that provision has been made for limiting the number of workpieces delivered onto the runways to one in each lane between each adjacent pair of push rollers; that means are provided for insuring that the gates 37 cannot close as a workpiece is being dropped through one of the openings; that the push rollers are positioned throughout their entire cycle of movement to continuously advance workpieces around an endless path; and that the runways are so inclined that workpieces tend to remain in contact with the rollers behind them to maintain substantially uniform spacing between the pieces and thereby provide ample time for the closing of the gates without fear of workpieces becoming trapped.

While in the foregoing the preferred embodiment of the invention has been described and shown it is understood that alternations and modifications may be made thereto provided the said alterations and modifications fall within the scope of the appended claims.

What we claim is:

1. A workpiece storing and distributing conveyor comprising, in combination: a plurality of vertically aligned and vertically spaced-apart generally horizontally extending runways, substantially semicircular diverters connecting adjacent extremities of the runways to form a continuous path for the recirculation of workpieces, a sprocket mounted in coaxial alignment with each diverter, an endless chain entrained over the sprockets and extending along the runways, push means mounted on and extending laterally from the chain at intervals along the length thereof whereby workpieces may be recirculated continuously along the runways, feeding means having a workpiece discharge extremity disposed intermediate the length of one of the runways adjacent the upstream end thereof in workpiece transfer relation with the runway for feeding work pieces to such runway between adjacent push means and responsive to the presence of a work piece between adjacent push means to withhold feeding between such push means, one of said runways having an opening through the bottom thereof through which workpieces may drop, a discharge chute extending beneath said opening, a gate for closing said opening, and means coupled with said gate normally holding the same open but responsive to the presence of a workpiece at a determined position in the discharge chute to close said gate, characterized in that the last-mentioned means which is coupled with the gate is also responsive to the movement of workpieces on the runway to synchronize closure of the gate with the absence of a workpiece on the runway at said opening.

2. A workpiece storing and distributing conveyor comprising, in combination: a pair of vertically aligned and spaced apart generally horizontally extending runways, substantially semicircular diverters connecting adjacent extremities of the runways to form a continuous path, a sprocket mounted for rotation in coaxial alignment with each diverter, an endless chain entrained over the sprockets for movement along the runways, push rollers mounted on and extending laterally from the chain at spaced-apart intervals along the length thereof, a workpiece feeding chute having a discharge end in workpiece transferring relation with the upstream end of one of the runways with such discharge end disposed intermediate the length of such runway, means at the discharge end of the feeding chute for permitting or preventing workpiece transfer from the feeding chute to the runway and responsive to the absence of a workpiece between a pair of push rollers at said discharge end to allow transfer of a workpiece to the runway and responsive to the presence of a workpiece between a pair of such push rollers at said discharge end to prevent transfer of a workpiece to the runway, the uppermost runway at a point intermediate the sprockets having an opening therethrough through which workpieces may drop, a discharge chute extending between the runways and below said opening to receive workpieces dropping therethrough, a gate for closing the opening, means coupled with the gate for opening and closing the same, said latter means responsive to the presence of a workpiece at a determined position in the discharge chute to close the gate, and means coupled with said latter means and responsive to movement of workpieces adjacent said opening to prevent operation of said latter means if a workpiece is entering the opening in the runway.

3. A workpiece storing and distributing conveyor comprising, in combination, a pair of vertically aligned and vertically spaced-apart runways lying in oppositely inclined planes and converging toward one end and diverging toward the opposite end, generally semicircular diverters connecting adjacent ends of the runways, sprockets rotatably mounted coaxially of the diverters, an endless conveyor chain entrained over the sprockets for movement in a direction upwardly of the inclined runways, push rollers mounted on the chain at spaced-apart intervals therealong and extending laterally thereof whereby workpieces on the runways ahead of the push rollers are gravity held by the inclination of the runways against the push rollers, means for feeding workpieces to one of said runways between adjacent push rollers and responsive to the presence of a workpiece between adjacent push rollers to withhold feeding between such rollers, one of said runways having an opening through the bottom through which workpieces may drop, a discharge chute extending beneath said opening, a gate for opening and closing said opening, means coupled with the gate normally holding the same open but responsive to the presence of a workpiece at a determined position in the discharge chute to close the gate, and such latter means responsive to the movement of workpieces on the runway to synchronize the closure of the gate with the absence of a workpiece at said opening.

4. A workpiece storing and distributing conveyor, comprising, in combination: a pair of vertically aligned and vertically spaced-apart runways lying in oppositely inclined planes and converging toward one end and diverging toward the opposite end, generally semicircular diverters connecting adjacent ends of the runways, a sprocket rotatably mounted coaxially of the diverter at the converging ends of the runways and a larger sprocket rotatably mounted coaxially of the diverter at the diverging ends of the runways, an endless conveyor chain entrained over the sprockets for movement in a direction upwardly of the inclined runways, push rollers mounted on the chain at spaced-apart intervals therealong and projecting laterally therefrom whereby workpieces on the runways ahead of the push rollers are gravity held thereagainst, a workpiece supply chute having a discharge end in workpiece transferring relation with the upstream end of one of the runways, gate means at the discharge end of the supply chute responsive to the absence of a workpiece between adjacent push rollers at said discharge end to allow transfer of a workpiece to the runway between the rollers while responsive to the presence of a workpiece between a pair of push rollers at said discharge end to prevent transfer of a workpiece, the uppermost runway intermediate said sprockets having an opening therethrough through which workpieces may drop, a discharge chute extending between the runways and below said opening to receive workpieces dropping therethrough, a gate for closing said opening, means coupled with the gate for opening and closing same, such latter means responsive to the presence of a workpiece at a determined position on the discharge chute to close the gate, and synchronizing means coupled with said latter means and responsive to movement of workpieces adjacent said opening to momentarily prevent said latter means from closing the gate if a workpiece is entering the opening.

References Cited in the file of this patent

UNITED STATES PATENTS

| | | |
|---|---|---|
| 1,418,574 | Hoyt et al. | June 6, 1922 |
| 1,802,546 | Albertoli | Apr. 28, 1931 |
| 2,311,747 | Gooch | Feb. 23, 1943 |
| 2,558,751 | Hebert | July 3, 1951 |
| 2,772,005 | Dubin | Nov. 27, 1956 |